(12) United States Patent
Chen

(10) Patent No.: US 11,556,020 B1
(45) Date of Patent: Jan. 17, 2023

(54) INTEGRATED WAVELENGTH SELECTOR

(71) Applicant: Acacia Communications, Inc., Maynard, MA (US)

(72) Inventor: Long Chen, Marlboro, NJ (US)

(73) Assignee: ACACIA COMMUNICATIONS, INC., Maynard, MA (US)

( * ) Notice: Subject to any disclaimer, the term of this patent is extended or adjusted under 35 U.S.C. 154(b) by 356 days.

(21) Appl. No.: 16/942,668

(22) Filed: Jul. 29, 2020

(51) Int. Cl.
*G02F 1/01* (2006.01)
*G02B 6/293* (2006.01)
*H01S 3/106* (2006.01)

(52) U.S. Cl.
CPC ....... *G02F 1/0147* (2013.01); *G02B 6/29335* (2013.01); *G02F 1/0123* (2013.01); *H01S 3/106* (2013.01)

(58) Field of Classification Search
CPC . G02F 1/0147; G02F 1/0123; G02B 6/29335; H01S 3/106
See application file for complete search history.

(56) References Cited

U.S. PATENT DOCUMENTS

| | | | |
|---|---|---|---|
| 6,621,580 B2 | 9/2003 | Myatt et al. | |
| 9,134,169 B2 * | 9/2015 | Li | G01J 1/0209 |
| 9,372,381 B2 | 6/2016 | Vermeulen et al. | |
| 9,405,073 B2 | 8/2016 | Chen et al. | |
| 9,477,039 B2 | 10/2016 | Doerr et al. | |
| 9,494,748 B2 | 11/2016 | Chen et al. | |
| 9,625,746 B2 | 4/2017 | Chen et al. | |
| 9,671,559 B2 | 6/2017 | Chen et al. | |
| 9,703,038 B1 | 7/2017 | Chen | |
| 9,726,840 B2 | 8/2017 | Chen | |
| 9,766,410 B1 | 9/2017 | Chen | |
| 9,829,659 B2 | 11/2017 | Chen et al. | |
| 9,829,727 B2 * | 11/2017 | Huang | G02B 6/122 |
| 9,922,887 B2 | 3/2018 | Vermeulen et al. | |
| 9,939,666 B2 | 4/2018 | Chen | |
| 9,977,269 B2 | 5/2018 | Chen | |
| 9,989,787 B2 | 6/2018 | Chen et al. | |
| 10,031,292 B2 | 7/2018 | Chen | |
| 10,088,733 B2 | 10/2018 | Doerr et al. | |
| 10,133,142 B2 | 11/2018 | Doerr et al. | |
| 10,203,453 B2 | 2/2019 | Chen | |
| 10,222,566 B1 | 3/2019 | Doerr et al. | |
| 10,241,268 B2 | 3/2019 | Chen et al. | |
| 10,284,300 B2 | 5/2019 | Doerr et al. | |
| 10,295,750 B2 | 5/2019 | Chen | |
| 10,416,380 B1 | 9/2019 | Chen et al. | |
| 10,527,871 B2 * | 1/2020 | Saeedi | G02F 1/025 |
| 10,551,715 B2 * | 2/2020 | Saeedi | G02F 1/025 |
| 2011/0058765 A1 * | 3/2011 | Xu | G02F 1/025 |
| | | | 385/2 |

(Continued)

FOREIGN PATENT DOCUMENTS

WO    WO 2002/039553 A2    5/2002

*Primary Examiner* — Ellen E Kim
(74) *Attorney, Agent, or Firm* — K&L Gates LLP

(57) ABSTRACT

Integrated wavelength selectors are described. The wavelength selector may include silicon nitride ring resonator disposed vertically between a heater and a temperature sensor. The temperature sensor may be formed of silicon in some embodiments. The wavelength selector may be coupled to the output port of a tunable laser, or may be disposed within a laser cavity.

20 Claims, 9 Drawing Sheets

(56) References Cited

U.S. PATENT DOCUMENTS

| | | | |
|---|---|---|---|
| 2011/0235962 A1* | 9/2011 | Shubin | G02F 1/025 |
| | | | 438/31 |
| 2012/0062974 A1* | 3/2012 | Manipatruni | G02F 1/011 |
| | | | 438/54 |
| 2012/0087613 A1* | 4/2012 | Rasras | G02F 1/2257 |
| | | | 257/E31.124 |
| 2012/0105177 A1* | 5/2012 | McLaren | G02F 1/0147 |
| | | | 333/17.1 |
| 2015/0198859 A1 | 7/2015 | Chen | |
| 2015/0212271 A1 | 7/2015 | Chen | |
| 2016/0127070 A1 | 5/2016 | Nagarajan et al. | |
| 2017/0045689 A1* | 2/2017 | Zhang | G02B 6/12007 |
| 2017/0059958 A1 | 3/2017 | Doerr et al. | |
| 2017/0139305 A1 | 5/2017 | Chen | |
| 2018/0003899 A1 | 1/2018 | Doerr et al. | |
| 2018/0041282 A1 | 2/2018 | Chen et al. | |

* cited by examiner

INTEGRATED WAVELENGTH SELECTOR

BACKGROUND

Field

The present application relates to optical wavelength lockers.

Related Art

Wavelength lockers are used to lock an optical signal to a particular wavelength. Some wavelength lockers employ ring resonators. The resonance frequency of the ring resonator serves as a reference frequency. The frequency of a signal of interest can be compared to the reference frequency provided by the ring resonator. The frequency of the signal of interest can be controlled to match the resonance frequency of the ring resonator.

BRIEF SUMMARY

An integrated wavelength selector is provided, comprising: a substrate; an integrated heater on the substrate; an integrated silicon temperature sensor on the substrate; and a ring waveguide of a first material disposed vertically between the integrated heater and the integrated silicon temperature sensor, the first material exhibiting a lower temperature coefficient of resonant frequency (TCF) than silicon.

According to an aspect of the present application, a tunable wavelength selector is provided, comprising: a micro-heater; a micro-temperature sensor formed of silicon; and an optical filter of a first material disposed vertically between the micro-heater and the micro-temperature sensor, the first material exhibiting a lower temperature coefficient of resonant frequency (TCF) than silicon.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Aspects of the present application provide an integrated semiconductor wavelength selector comprising an optical filter with an integrated heater and an integrated temperature sensor. The temperature sensor may be formed of silicon. The optical filter may be formed of a material having a lower temperature coefficient of resonant frequency (TCF) than silicon. For example, the optical filter may comprise silicon nitride. The optical filter, temperature sensor, and heater may be disposed vertically in a stack, with the optical filter between the temperature sensor and the heater. In some embodiments, the optical filter is a ring resonator.

In some embodiments, an integrated semiconductor wavelength selector configured as a wavelength locker is provided. For example, the wavelength selector may be coupled to an output of a laser, allowing for the laser frequency to be locked to a reference frequency presented by the wavelength locker. The reference frequency may be adjusted by controlling a temperature of the wavelength locker. In some embodiments, an array of wavelength lockers with different reference frequencies may be coupled to a laser output. A tunable laser may be provided by coupling a laser output to the wavelength locker or to an array of wavelength lockers.

In some embodiments, an integrated semiconductor wavelength selector may be disposed in a laser cavity to control the frequency output by the laser. In such situations, the wavelength selector may operate to select the laser output frequency. In some embodiments, the wavelength selector is coupled to the optical path within the laser cavity by a tap coupler. In some embodiments, the wavelength selector is disposed in the optical path within the laser cavity.

In some embodiments, arrays of integrated wavelength selectors are provided. The arrays may include two or more integrated wavelength selectors of the types described herein. The arrays may be used to provide frequency tuning of an optical signal.

The aspects and embodiments described above, as well as additional aspects and embodiments, are described further below. These aspects and/or embodiments may be used individually, all together, or in any combination of two or more, as the application is not limited in this respect.

Figure 1A:
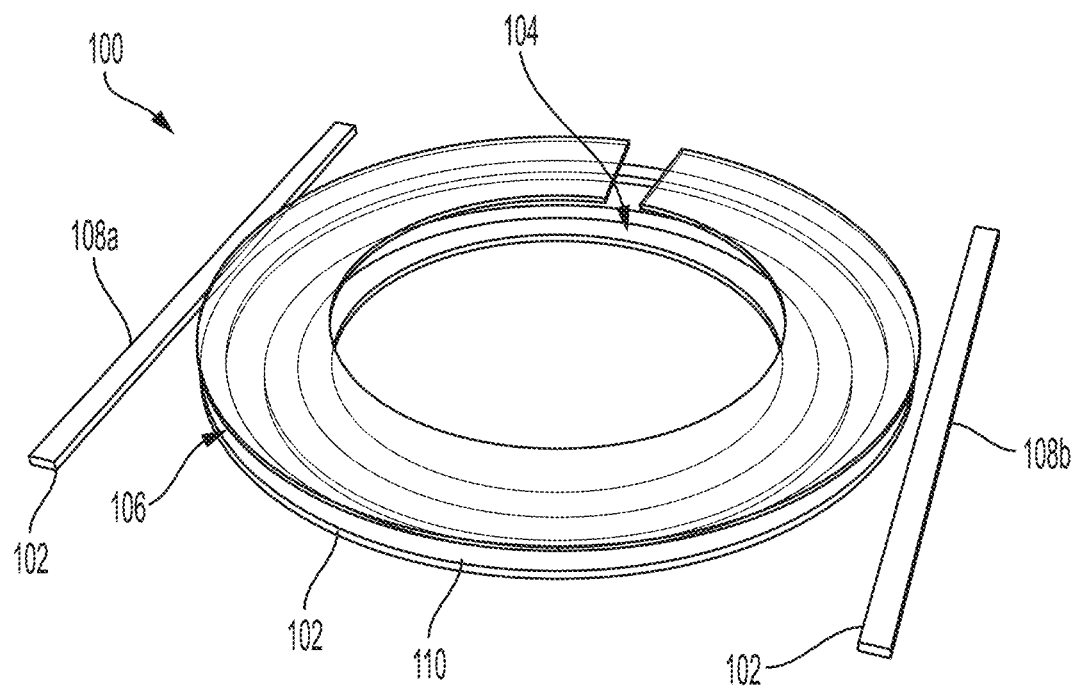
FIG. 1A is a perspective view of an integrated wavelength selector, according to a non-limiting embodiment of the present application.
Figure 1B:
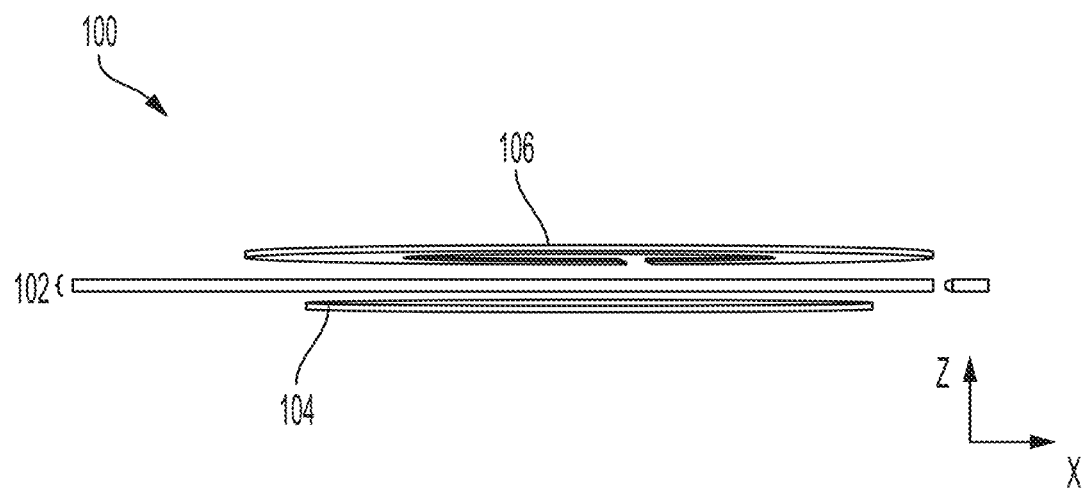
FIG. 1B is a side view of the integrated wavelength selector of FIG. 1A.

FIG. 1A is a perspective view of an integrated wavelength selector, according to a non-limiting embodiment of the present application. The integrated wavelength selector 100 comprises a ring resonator 102, temperature sensor 104, and heater 106. The ring resonator represents a non-limiting example of an optical filter. Examples of other optical filters that may be used in a wavelength selector of the types described herein include disk resonators, race-track resonators, and Fabry-Perot interferometers. Returning to FIG. 1A, the ring resonator may comprise an input waveguide 108a, an output waveguide 108b, and a ring waveguide 110. In some embodiments, such as that shown in FIG. 1A, the ring resonator may comprise first and second waveguides disposed on opposite sides of the ring waveguide. FIG. 1B is a side view of the integrated wavelength selector 100 of FIG. 1A.

In some embodiments, an integrated wavelength selector comprises a ring resonator of a different material than a temperature sensor of the integrated wavelength selector. For example, referring to FIGS. 1A and 1B, the ring resonator 102 may be a different material than the temperature sensor 104. The material of the ring resonator 102 may be selected to exhibit relatively little change in resonance frequency with changes in temperature. The resonance frequency of the ring resonator, or an offset from the resonance frequency, may serve as a reference frequency. For some applications, precise control of the resonance frequency may be desired. For example, certain applications of tunable lasers may call for control of the laser frequency within +/−1 GHz. Use of a wavelength selector to tune the frequency of such tunable lasers may therefore call for control of the resonance frequency of the wavelength selector within +/−1 GHz. The resonance frequency of a semiconductor ring resonator may vary with temperature. According to some embodiments, a ring resonator of an integrated wavelength selector is formed of a material that exhibits a relatively low variation in resonance frequency for a given change in temperature. For example, the ring resonator 102 may comprise silicon nitride. Silicon nitride has a lower TCF than, for example, silicon. However, the ring resonator 102 may be formed of other materials in alternative embodiments. For example, the ring resonator may comprise siliconoxynitride. In some embodiments, the ring resonator comprises SiOx or SiON. The ring resonator may be formed of a material compatible with silicon microfabrication processing. In some embodiments, the temperature sensor of an integrated wavelength selector of the types described herein may be formed of silicon. For example, the temperature sensor 104 may be formed of silicon to be compatible with silicon processing technology. Referring again to FIG. 1A, as a non-limiting example, the ring resonator 102 may be formed of silicon nitride and the temperature sensor 104 may be formed of silicon. In some embodiments, then, the ring resonator may be formed of a material different than the temperature sensor.

As described above, in some embodiments an offset from the resonance frequency of the ring resonator may be used as a reference frequency. For example, an offset of 1 GHz, 2 GHz, or between 1 GHz and 10 GHz from the resonance frequency may be used as the reference signal. In some embodiments, the frequency at which there is equal transmission through the input waveguide 108a and the output waveguide 108b is used as the reference frequency. The various aspects described herein are not limited to use of the resonance frequency as the reference frequency.

As has been described, the integrated temperature sensor 104 of FIG. 1A may be formed of silicon. In some embodiments, such as that of FIGS. 1A and 1B, the temperature sensor 104 may be a p-n diode, wherein the p and n regions are shaped as rings. For example, the temperature sensor 104 may be a silicon p-n diode with an outer ring doped p-type or n-type, and an inner ring doped the opposite type of the outer ring. In some embodiments, the temperature sensor may be a resistive temperature sensor. For example, the temperature sensor may be a ring-shaped resistor of doped silicon. Returning to FIG. 1A, the heater 106 may be formed of a resistive material. For example, the heater 106 may be formed of TiN, TaN, or polysilicon. As a non-limiting example, the ring resonator 102 is formed of silicon nitride, the temperature sensor 104 is a silicon p-n diode, and the heater 106 is a polysilicon resistive heater. Other combinations of materials are possible for the integrated wavelength selector 100.

Referring to FIGS. 1A and 1B, the ring resonator 102, temperature sensor 104, and heater 106 are stacked vertically. For example, referring to FIG. 1B, the ring resonator 102 may be above the temperature sensor 104 in the z-direction. The heater 106 may be above the ring resonator 102 in the z-direction. In some embodiments, such as that shown, an integrated wavelength selector comprises a vertical stack of an optical filter, a heater, and a temperature sensor, with the optical filter being disposed between the heater and the temperature sensor. The optical filter may be a ring resonator, as shown in FIGS. 1A and 1B. Returning to FIG. 1B, the distance between the heater and the ring resonator may be selected to ensure low or no overlap of the optical signal from the ring resonator in the heater, while also ensuring the heater is sufficiently close to the ring resonator to heat it. As opposed to silicon waveguides, silicon nitride and silicon oxynitride waveguides do not confine light as tightly. The optical signal in such waveguides may leak from the waveguides into surrounding structures. Leakage of light from the waveguides into the heater may be undesirable. Returning to FIG. 1B, the spacing between the heater 106 and the waveguides of the ring resonator 102 may be selected to avoid light leaking from the waveguides into the heater.

Referring still to FIGS. 1A and 1B, the illustrated components may have any suitable dimensions. For example, the ring waveguide 110 may have a diameter selected to provide a desired resonance frequency. As shown in FIGS. 1A and 1B, the temperature sensor 104 may be narrower than the ring waveguide 110 in the x-y plane. In some embodiments, the heater 106 may be sized to substantially overlap with the ring waveguide 110. In some embodiments, such as that shown, the heater 106 may be a ring substantially overlying the ring resonator. The components may be separated by any suitable spacing. For example, the ring resonator 102 may be separated from the temperature sensor 104 in the z-direction by between 1 and 20 microns, including any value within that range, although other distances are possible. The heater 106 may be spaced from the ring resonator 102 by between 1 and 20 microns, including any value within that range, although other distances are possible. As a non-limiting example, the ring waveguide has an inner diameter between 10 and 150 microns, the temperature sensor has an inner diameter narrower than ring waveguide by between 5% and 25%, and the heater has an inner diameter larger than the ring waveguide by between 1% and 20%. In some embodiments, the ring waveguide 110, temperature sensor 104, and heater 106 may have dimensions on the order of microns. The heater 106 is a micro-heater in some embodiments. The temperature sensor 104 is a micro-temperature sensor in some embodiments. The ring waveguide has a larger radius than the temperature sensor 104 in some embodiments.

In operation, an input optical signal is provided to the ring resonator 102 on input waveguide 108a. For example, the input optical signal may represent a tapped signal from an optical waveguide. For example, it may be desired to know or control the frequency of an optical signal traveling through an optical waveguide, so the optical signal may be tapped to provide a portion thereof to the integrated wavelength selector 100. Returning to FIG. 1A, the optical signal may couple from the input waveguide 108a to the ring waveguide 110, and from the ring waveguide 110 to the output waveguide 108b. The amount of light remaining on the input waveguide 108a and on the output waveguide 108b may be detected using photodetectors. The detected amount of light, or the ratio of the detected amount of light on the input waveguide 108a to the amount of light on the output waveguide 108b, may be used to determine the frequency of the optical signal. The temperature sensor 104 may detect the temperature of the integrated wavelength selector 100. Information about the detected temperature may be used to control the heater 106. The heater 106 may be controlled to provide a desired amount of heat to control the temperature of the integrated wavelength selector 100. The temperature of the integrated wavelength selector 100 may be controlled to provide a desired resonance frequency of the optical filter, such as the ring resonator 102. In some embodiments, the temperature sensor 104 and the heater 106 are coupled in a feedback loop.

Figure 2:
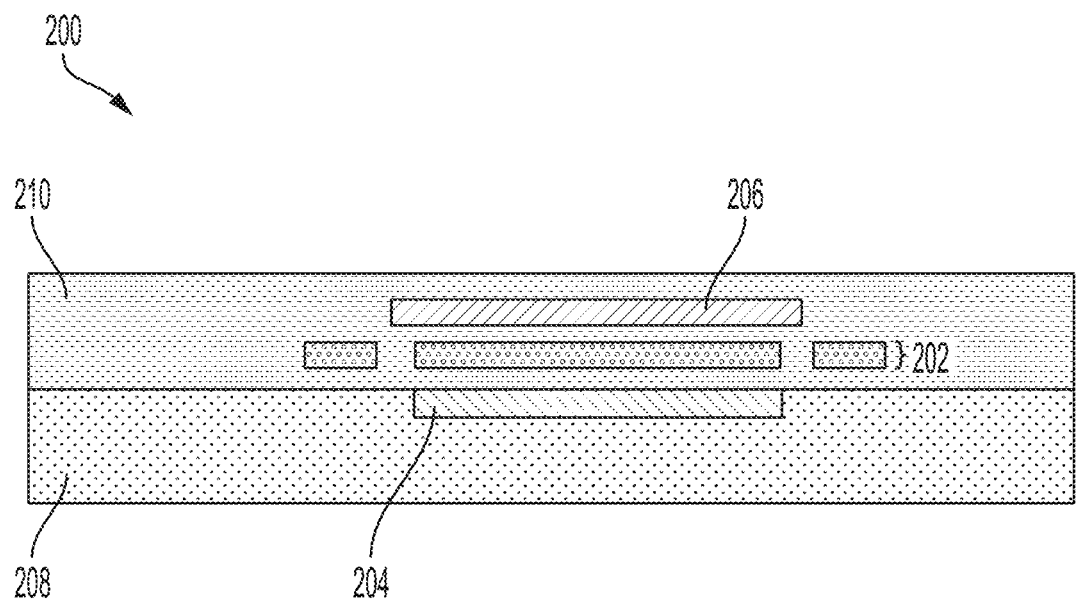
FIG. 2 is a side view of an integrated wavelength selector of the type shown in FIGS. 1A and 1B.

FIG. 2 is a side view of an integrated wavelength selector 200 of the type shown in FIGS. 1A and 1B. The integrated wavelength selector 200 comprises ring resonator 202, a temperature sensor 204, and a heater 206. The temperature sensor 204 may be a silicon temperature sensor disposed in a semiconductor substrate 208 The semiconductor substrate 208 may be a silicon substrate. The ring resonator 202 may comprise a material having a lower TCF than that of silicon. For example, the ring resonator 202 may be formed of any of the materials described previously in connection with ring resonator 102. The heater 206 may be a resistive heater. The heater 206 may be formed of any of the materials described previously in connection with heater 106. The ring resonator 202 and heater 206 may be disposed within an insulating layer 210. The insulating layer 210 may be silicon dioxide, or any other suitable insulating material. As a non-limiting example of an implementation of the integrated wavelength selector 200, the semiconductor substrate 208 is a silicon substrate, the temperature sensor 204 is a silicon temperature sensor, the ring resonator 202 is a silicon nitride ring resonator, the heater 206 is a resistive heater, and the insulating layer 210 is silicon dioxide. Integrated wavelength selectors of the type illustrated in FIG. 2 may be formed of alternative combinations of materials than those listed. In some embodiments, the semiconductor substrate 208 may be replaced with a dielectric substrate, such as silicon dioxide, and the temperature sensor 204 may be disposed in a semiconductor layer on the dielectric substrate.

Figure 3:
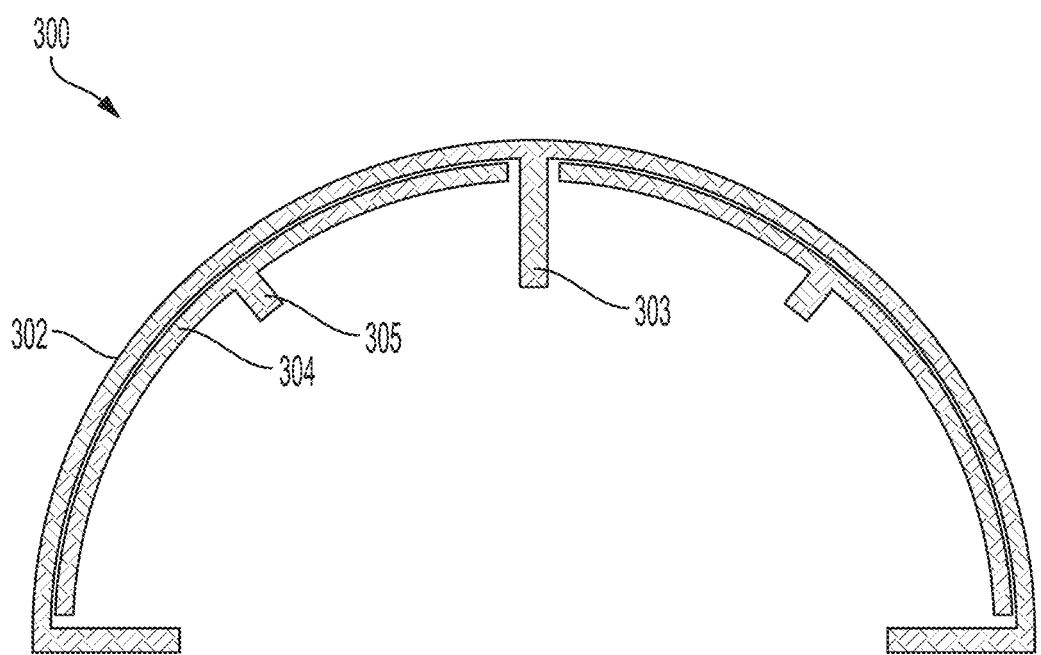
FIG. 3 illustrates a top view of a portion of a temperature sensor as may be implemented in a wavelength selector, according to a non-limiting embodiment of the present application.

FIG. 3 illustrates a top view of a portion of a temperature sensor as may be implemented in a wavelength selector of the types described herein, according to a non-limiting embodiment of the present application. As described above in connection with FIGS. 1A and 1B, in some embodiments an integrated temperature sensor of a wavelength selector may be a pn junction silicon temperature sensor. FIG. 3 illustrates one half of a pn junction silicon temperature sensor of the type that may be employed in an integrated wavelength selector. The temperature sensor 300 comprises an outer ring portion 302 and an inner ring portion 304. One of the outer ring portion 302 and the inner ring portion 304 may be doped p-type, and the other may be doped n-type. For example, the outer ring portion 302 may be a p-type ring and the inner ring portion 304 may be an n-type ring. Returning to FIG. 3, the outer ring portion 302 include an electrical contact tab 303. The inner ring portion 304 includes an electrical contact tab 305. The electrical contact tabs 303 and 305 may facilitate making electrical contact to the temperature sensor. As described above, and as shown in FIGS. 1A and 1B, an integrated temperature sensor may be disposed underneath a ring resonator in a vertical stack. Therefore, making electrical contact to the temperature sensor may involve providing an electrical path that circumvents the ring resonator. Referring to FIG. 1A, electrical contact to the temperature sensor 104 may be made using conductive vias that pass through a center of the ring resonator 102 and the heater 106. Returning to FIG. 3, the electrical contact tabs 303 and 305 extend toward a center of the temperature sensor, allowing electrical contact to be made by vias which may pass through a center of a ring resonator overlying the temperature sensor 300. As an alternative to a p-n diode temperature sensor, in some embodiments the temperature sensor may be a resistive temperature sensor. For example, the temperature sensor may be formed of doped silicon, acting as a resistive silicon temperature sensor. In some embodiments, the temperature sensor may be a ring-shaped resistor of doped silicon.

According to an aspect of the present application, an integrated wavelength selector comprises thermal isolation structures. As described previously herein, an integrated wavelength selector may include an integrated heater to control the temperature of the optical filter, such as a ring resonator. For example, the resonance frequency of the ring resonator may be controlled by controlling the temperature of the ring resonator. As has also been described previously herein, an integrated wavelength selector may include a temperature sensor configured to sense a temperature of the integrated wavelength selector. In particular, the temperature sensor may be employed to sense a temperature of the optical filter, such as a ring resonator. In combination, the temperature sensor and heater may provide precise control of the temperature of the optical filter, and thus precise control of its resonance frequency. Such functionality may be facilitated or enhanced by confining the heat from the heater around the optical filter. Such functionality may be facilitated by confining the heat around the temperature sensor, so that the temperature sensor accurately senses the temperature of the optical filter. Accordingly, aspects of the present application provide thermal isolation structures as part of an integrated wavelength selector. The thermal isolation structure may be positioned to confine heat from a heater around an optical filter and temperature sensor of the integrated wavelength selector.

Figure 4:
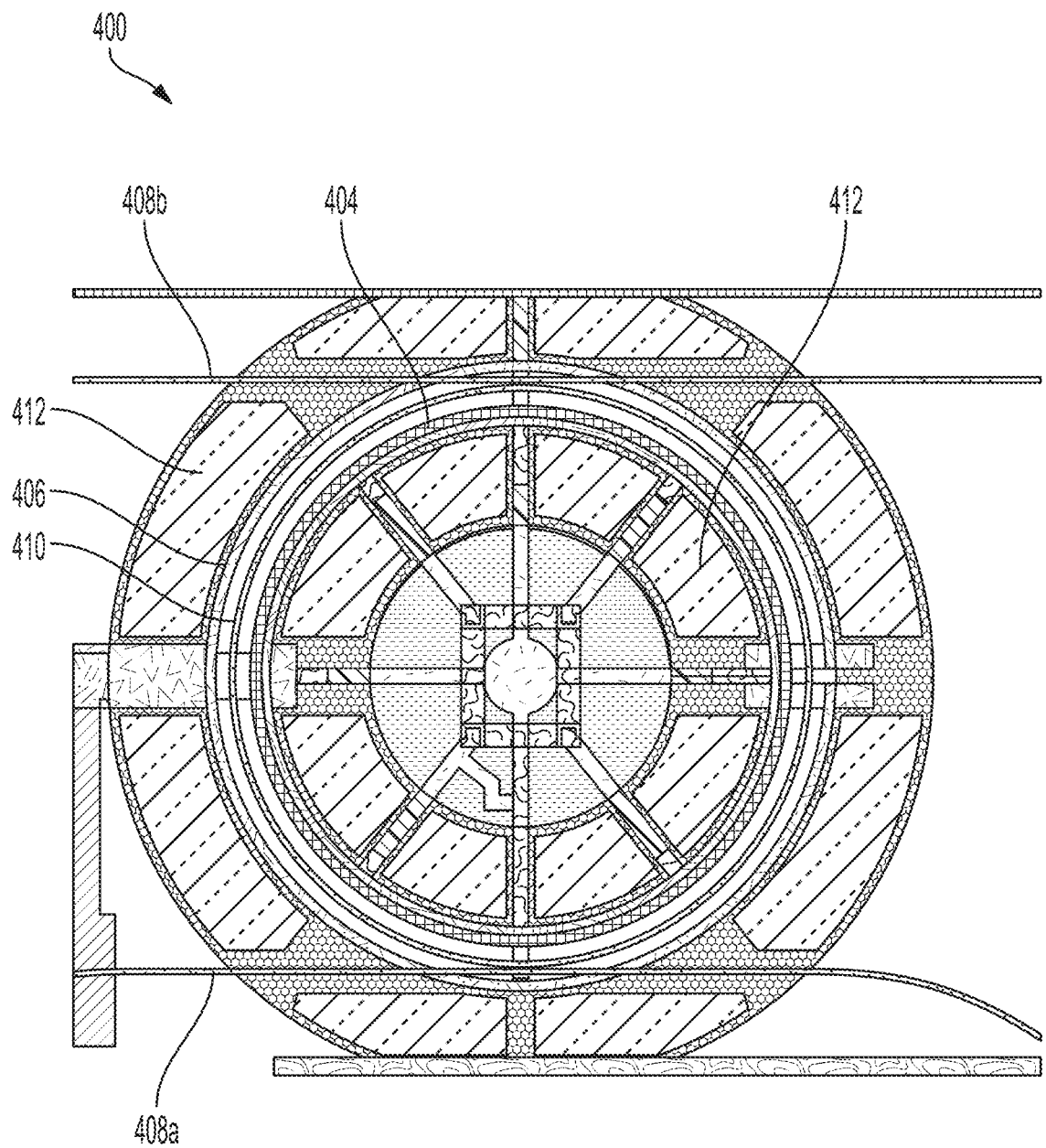
FIG. 4 illustrates a plan view of a wavelength selector comprising a plurality of thermal isolation trenches, according to a non-limiting embodiment of the present application.

FIG. 4 illustrates a plan view of a wavelength selector comprising a plurality of thermal isolation trenches, according to a non-limiting embodiment of the present application. The integrated wavelength selector 400 comprises a temperature sensor 404, heater 406, and ring resonator formed by input waveguide 408a, output waveguide 408b, and ring waveguide 410. The integrated wavelength selector 400 further comprises thermal isolation trenches 412. In some embodiments, the thermal isolation trenches extend through the entire stack including the temperature sensor 404, heater 405, and ring resonator, to provide thermal isolation of those components and a substantially homogenous temperature among those components.

As shown in the non-limiting example of FIG. 4, the temperature sensor 404 is a pn diode of the type illustrated previously in connection with FIG. 3, wherein the junction is formed between inner and outer doping rings. The heater 406 overlies the ring waveguide 410 and the temperature sensor 404. The thermal isolation trenches 412 are configured to confine the heat from the heater 406 radially within the region in which the ring waveguide 410 and the temperature sensor 404 are disposed. The thermal isolation trenches 412 facilitate uniform heating and a reduced temperature gradient within the region comprising the ring resonator and the temperature sensor. The thermal isolation trenches may comprise a thermally insulating material. For example, the thermal isolation trenches 412 may be filled with silicon oxide, as a non-limiting example. The number and sizing of the thermal isolation trenches 412 may be selected to provide a desired degree of thermal confinement of the heat from the heater within the region comprising the ring waveguide 410 and the temperature sensor 404. In at least some embodiments, the thermal isolation trenches 412 extend vertically at least from the temperature sensor 404 to the heater 406. In some embodiments the thermal isolation trenches 412 extend from a depth beneath the temperature sensor 404 to a height above the heater 406. As has been described previously, in some embodiments the temperature sensor may be a resistive temperature sensor.

Integrated wavelength selectors of the types described herein may be configured to operate as wavelength lockers or as intra-cavity wavelength selectors, according to various embodiments of the present application. A wavelength selector may be configured as wavelength locker in some embodiments. For example, coupling the wavelength selector to an output of a laser may facilitate locking the laser frequency to a reference wavelength presented by the wavelength locker. The resonance frequency of the wavelength selector may be controlled by controlling the temperature of the wavelength selector, and may be used to provide a tunable wavelength locker. The tunable wavelength locker may be coupled to a laser output to provide a tunable laser. In some embodiments, coupling an array of wavelength selectors of different resonance frequencies to an output of a laser may provide for a tunable laser. The laser may be turned to have a frequency matching a desired reference frequency from the array of wavelength selectors. In these embodiments, the wavelength selector or array of wavelength selectors may allow for locking the laser frequency to a desired frequency. In some embodiments, a wavelength selector or array of wavelength selectors may form part of a laser cavity. The laser may laze when the laser frequency matches the resonance frequency of the wavelength selector, or one of the wavelength selectors of the array of wavelength selectors. In this manner, the wavelength selectors may operate to select the frequency of a laser output signal.

Figure 5:
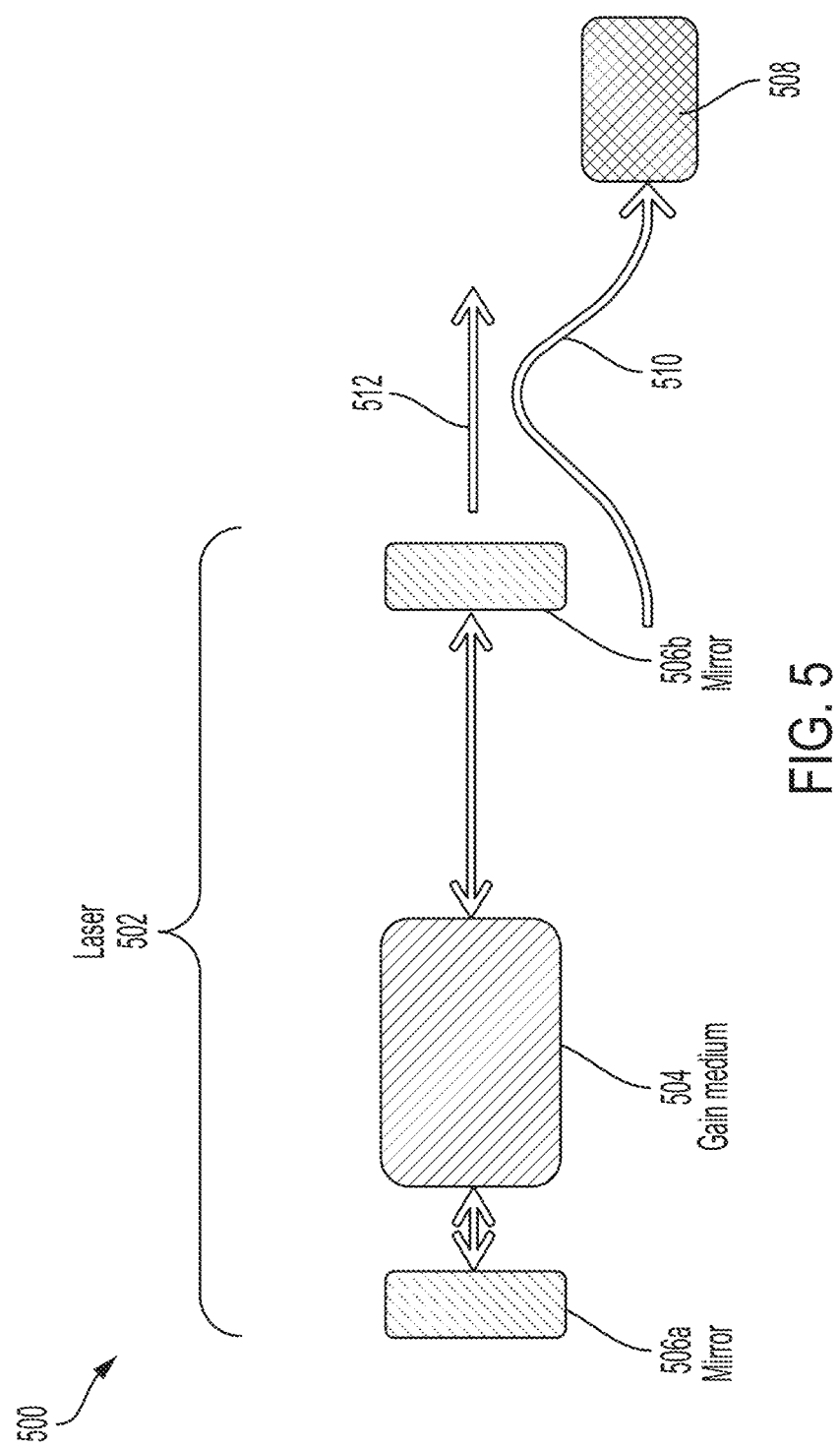
FIG. 5 illustrates an apparatus comprising a laser and a wavelength locker coupled to an output port of the laser, according to a non-limiting embodiment of the present application.

FIG. 5 illustrates an apparatus comprising a tunable laser and a wavelength locker coupled to an output port of the tunable laser, according to a non-limiting embodiment of the present application. The apparatus 500 comprises a laser 502 and a wavelength locker 508. The laser 502 comprises a gain medium 504, mirror 506a, and mirror 506b. The laser has an output port 512 configured to provide an output laser signal. The wavelength locker 508 may be any of the types of integrated wavelength selectors described herein. For example, the wavelength locker 508 may be the integrated wavelength selector 100 of FIG. 1A. Returning to FIG. 5, the wavelength locker 508 is coupled to the output port 512 of the laser 502 by a coupling waveguide 510. The coupling waveguide 510 is a tap coupler in some embodiments.

In operation, the laser 502 outputs laser light from the output port 512. A portion of the laser light from output port 512 couples to the coupling waveguide 510. The laser light is provided as an input to the wavelength locker 508. For example, the wavelength locker 508 may be the integrated wavelength selector 100 of FIG. 1A. The laser light may be provided as an input on the input waveguide 108a. Returning to FIG. 5, the wavelength locker 508 may provide an indication of a frequency of the laser light provided at the output port 512. The laser 502 may be tuned until the wavelength locker 508 indicates that the laser light has a frequency substantially matching the reference frequency presented by the wavelength locker 508. In this manner, the frequency of the laser light provided at the output port 512 may be locked to the reference frequency presented by the wavelength locker 508. Moreover, the reference frequency presented by the wavelength locker 508 may be adjusted. For example, as described previously in the context of FIG. 1A, the resonance frequency of an integrated wavelength selector may be adjusted by controlling the temperature of the integrated wavelength selector. Returning to FIG. 5, in some embodiments the wavelength locker comprises an optical filter having a resonance frequency, and the resonance frequency of the wavelength locker 508 may be adjusted by controlling the temperature of the wavelength locker. In this manner, the laser light at the output port 512 may be locked to a variable frequency. The laser 502 may be a tunable laser.

Figure 6:
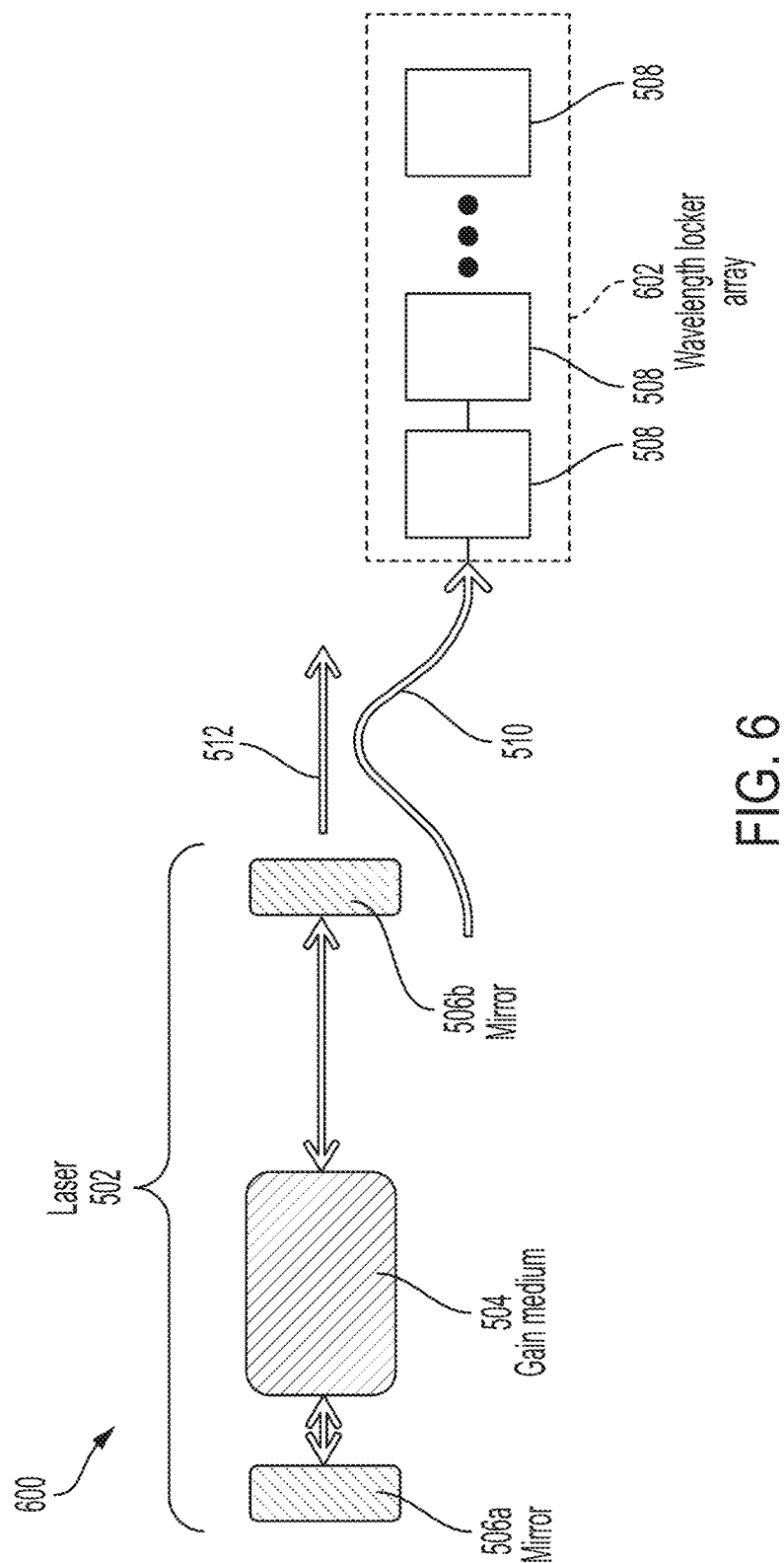
FIG. 6 illustrates an apparatus comprising a tunable laser and a wavelength locker array coupled to an output of the tunable laser, according to a non-limiting embodiment of the present application.

FIG. 6 illustrates an apparatus comprising a wavelength locker array. The apparatus 600 comprises several components in common with the apparatus 500. The same reference numbers are used for those components, and they are not described in detail again here. The apparatus further comprises a wavelength locker array 602 comprising a plurality of wavelength lockers 508. The wavelength lockers 508 of the wavelength locker array 602 may have respective resonance frequencies. For example, the wavelength lockers 508 may have ring resonators of different resonance frequencies due to differences in size, or may be heated to different temperatures using the respective heater. The laser signal produced at output port 512 may be coupled to the wavelength locker array 602 by the coupling waveguide 510. The wavelength lockers 508 of the wavelength locker array 602 may be connected in series or in parallel. In either configuration, they may each provide an indication of whether the frequency of the laser signal at output port 512 matches their respective resonance frequency. The laser 502 may be tuned to match one of the reference frequencies of the wavelength locker array. In this manner, the frequency of the laser signal may be selectable.

As described previously, aspects of the present application provide a laser comprising a wavelength selector of the types described herein disposed in the optical cavity of the laser. As described previously, integrated wavelength selectors having an optical filter formed of a material with a lower TCF than silicon may provide greater temperature stability than would be provided by an optical filter made of silicon. In some embodiments, use of an optical filter formed of a material other than silicon, such as silicon nitride, may increase temperature stability of the wavelength selector by a factor of five or more. Greater temperature stability of the optical filter's resonance frequency may relax the temperature control needed to achieve a particular resonance frequency. For example, use of a silicon nitride ring resonator as part of a wavelength selector may relax the temperature control to achieve a particular frequency of the wavelength selector by a factor of five or more compared to use of a silicon ring resonator. In some embodiments, relaxing the temperature control of the optical filter may facilitate including the optical filter directly in a laser cavity, where precise temperature control can be challenging. In some embodiments, stoichiometric $Si_3N_4$ may be used as a ring resonator of an integrated wavelength selector. Its thermooptical coefficient is about $2.5e^{-5}$ at 1550 nm and room temperature. Therefore, the temperature control accuracy of $Si_3N_4$ waveguides can be relaxed to about 0.5C, which is 5 times of that of a silicon-based optical filter.

Figure 7:
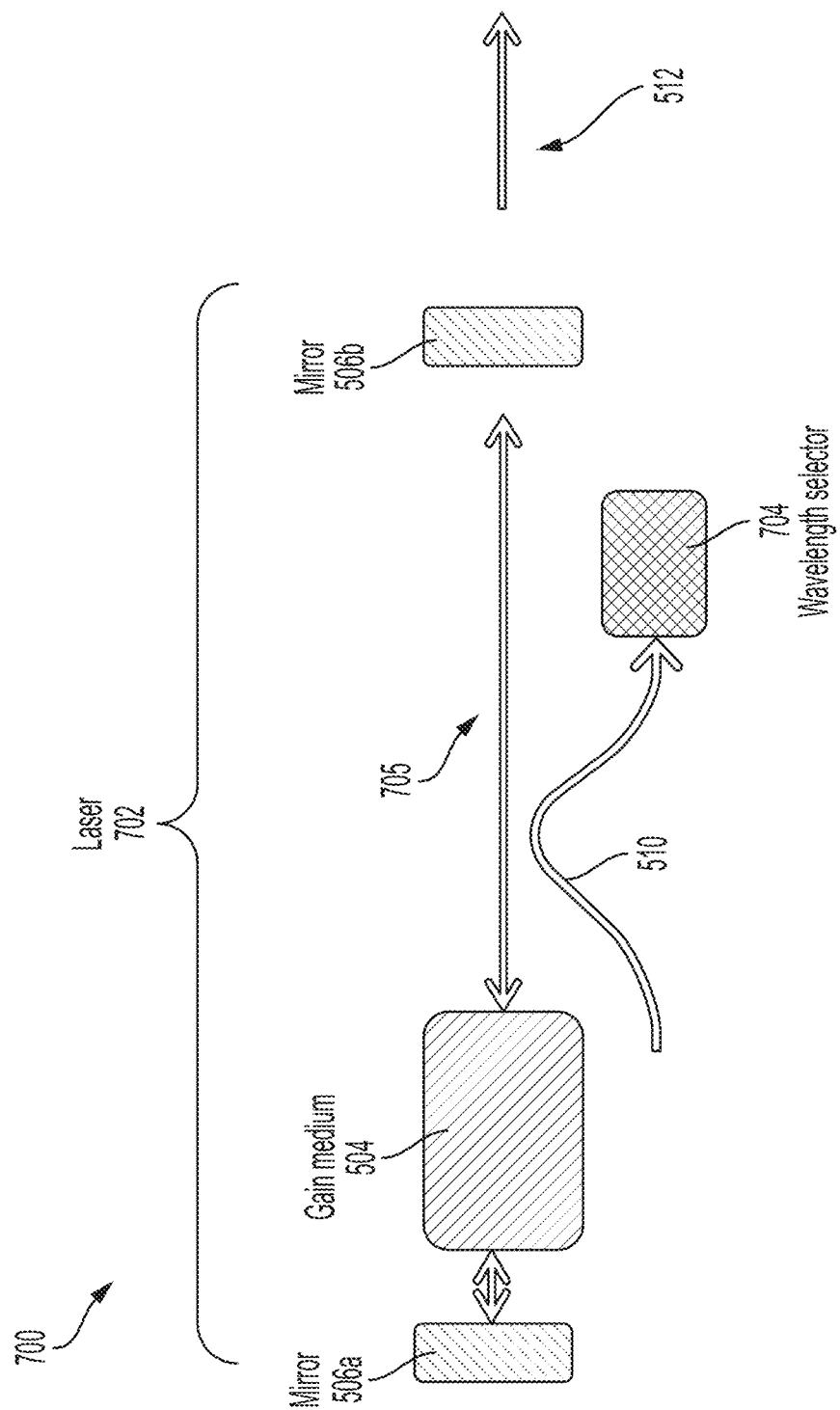
FIG. 7 illustrates an apparatus comprising a laser having a laser cavity including a wavelength selector coupled to the optical path by a tap coupler, according to a non-limiting embodiment of the present application.

FIG. 7 illustrates an apparatus comprising a laser having a laser cavity including a wavelength selector coupled to the optical path by a tap coupler, according to a non-limiting embodiment of the present application. The apparatus 700 comprises several components in common with the apparatus 500. The same reference numbers are used for those components, and they are not described in detail again here. The apparatus comprises a laser 702 having a laser cavity including the gain medium 504 and mirrors 506a-506b. A wavelength selector 704 is also included within the laser cavity. The wavelength selector 704 may be any of the types of wavelength selectors described herein. For example, the integrated wavelength selector 100 of FIG. 1A may be used as the wavelength selector 704. The wavelength selector 704 is coupled to the optical path 705 of the laser 702 by the tap coupler 510. The wavelength selector 704 presents a reference frequency to which the laser signal in the optical path 705 can be compared. For example, the wavelength selector 704 may operate in the manner described previously in connection with wavelength selector 100. As a result, the laser signal output from the output port 512 may be the same reference as the reference frequency presented by the wavelength selector. In some embodiments, the wavelength selector 704 is tunable through temperature control, in the manner describe previously in connection with FIG. 1A. Therefore, in some embodiments, a tunable laser is provided comprising a wavelength selector disposed within a laser optical cavity and coupled to the optical path of the laser cavity by a tap coupler.

Figure 8:
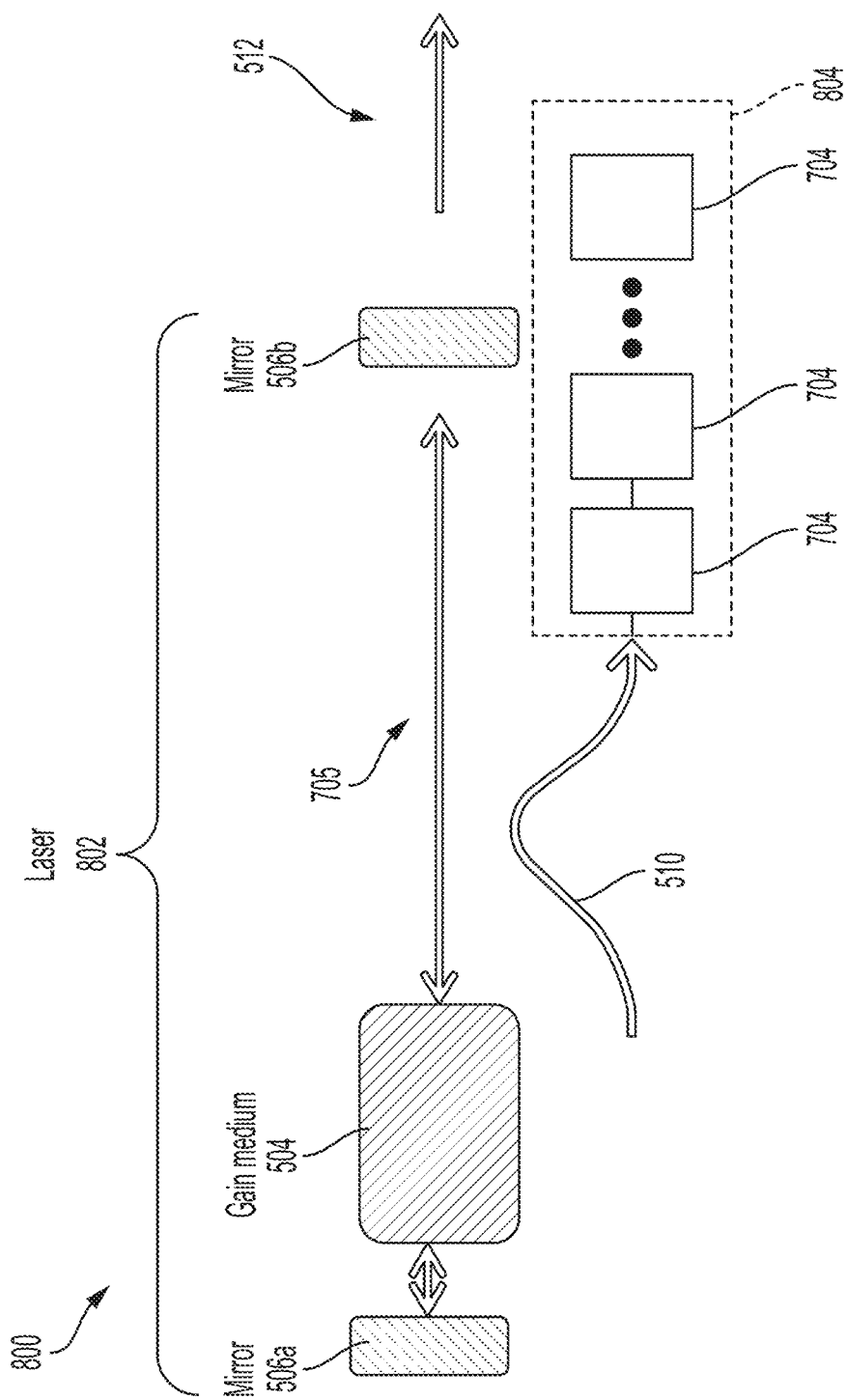
FIG. 8 illustrates an apparatus comprising a laser having a laser cavity including a wavelength selector array coupled to the optical path by a tap coupler, according to a non-limiting embodiment of the present application

FIG. 8 illustrates an apparatus comprising a laser having a laser cavity including a wavelength selector array coupled to the optical path by a tap coupler, according to a non-limiting embodiment of the present application. The apparatus 800 comprises several components in common with the apparatus 700. However, laser 802 of the apparatus 800 comprises a wavelength selector array 804 comprising a plurality of wavelength selectors 704 of the type described in connection with FIG. 7. The wavelength selectors 704 of the wavelength selector array 804 may have respective resonance frequencies. For example, the wavelength selectors 704 may have ring resonators of different resonance frequencies due to differences in size, or may be heated to different temperatures using the respective heater. The laser signal in the optical path 705 may be locked to one of the reference frequencies presented by the wavelength selector array. In this manner, a tunable laser may be achieved.

Figure 9:
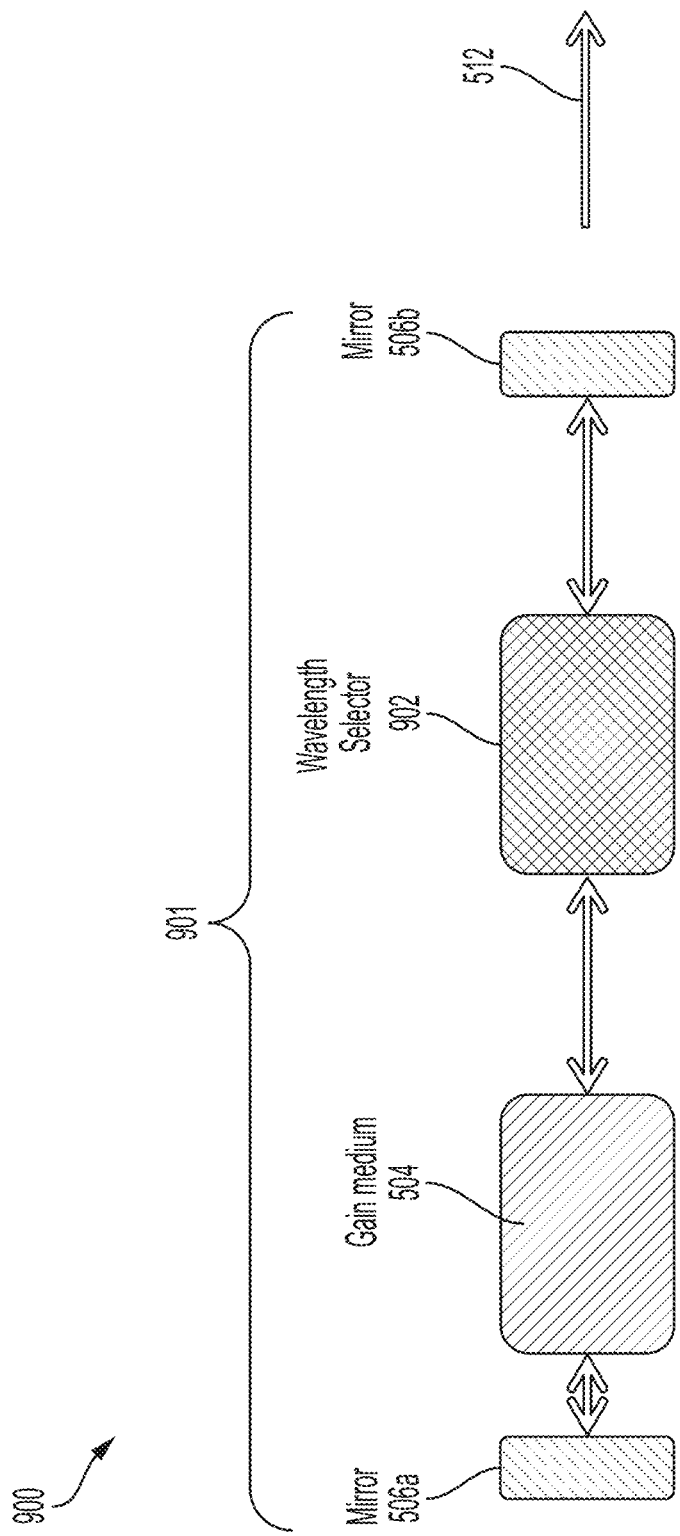
FIG. 9 illustrates an apparatus comprising a laser having a laser cavity including a wavelength selector disposed in the optical path, according to a non-limiting embodiment of the present application.

FIG. 9 illustrates an apparatus comprising a laser having a laser cavity including a wavelength selector disposed in the optical path, according to a non-limiting embodiment of the present application. The apparatus 900 comprises a laser 901 having several components in common with the apparatus 700. The wavelength selector 902 is disposed in the optical path of the laser cavity. Thus, the laser signal may transmit in both directions through the wavelength selector 902. Lasing may occur when the laser signal in the laser cavity substantially matches the reference frequency presented by the wavelength selector 902. The wavelength selector 902 may be any of the types of wavelength selectors described herein. In some embodiments, the wavelength selector may be a wavelength selector array presenting multiple reference frequencies. In some embodiments, then, a plurality of integrated heaters, integrated silicon temperature sensors, and ring resonators are disposed in the cavity of the tunable laser.

Figure 10:
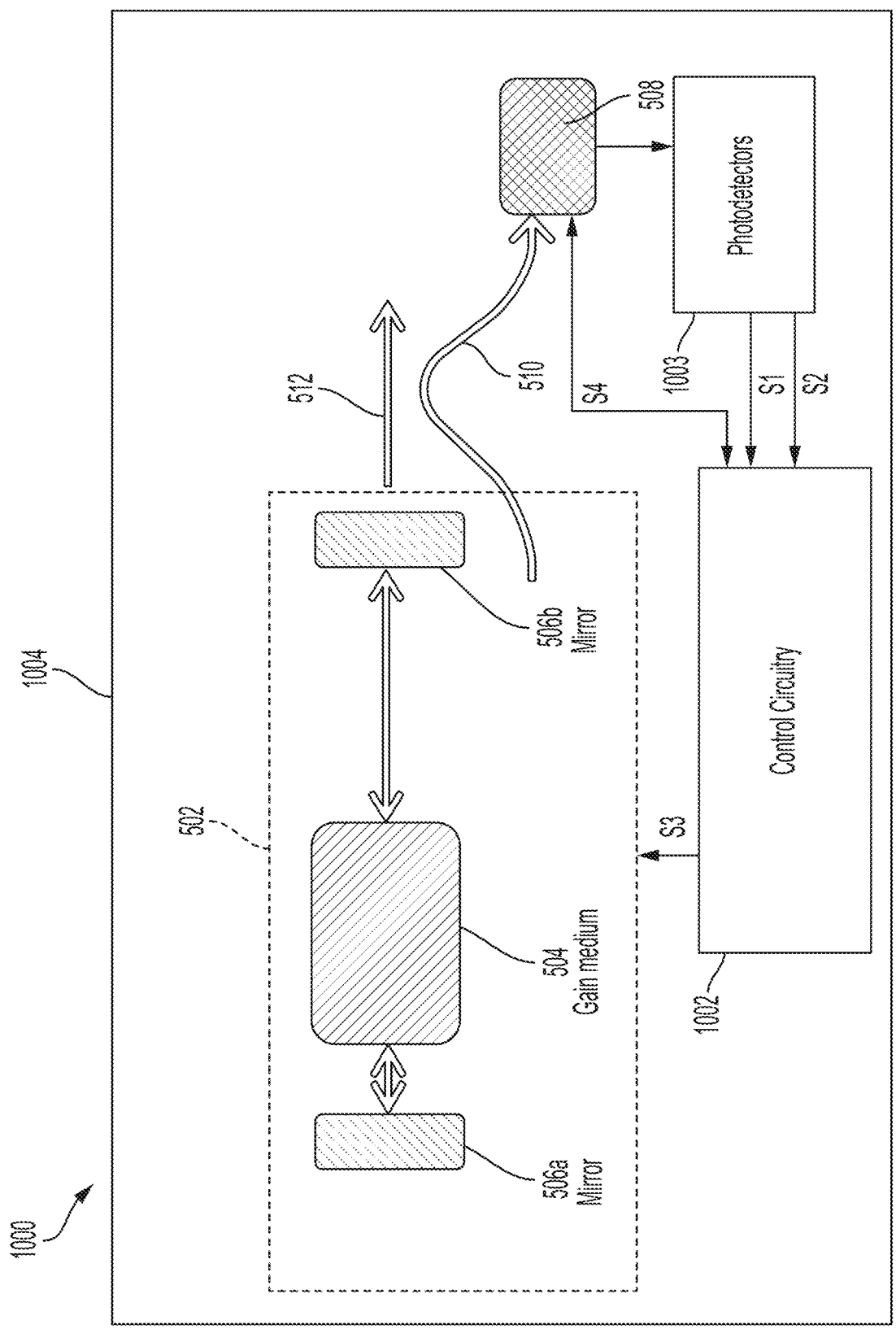
FIG. 10 illustrates an optical system comprising a laser, an integrated wavelength selector, and control circuitry, on a substrate, according to a non-limiting embodiment of the present application.

FIG. 10 illustrates an optical system comprising a laser, an integrated wavelength selector, and control circuitry, on a substrate, according to a non-limiting embodiment of the present application. The optical system 1000 comprises the laser 502 and wavelength locker 508 coupled to the output port 512 by the coupling waveguide 510. The system 1000 further comprises control circuitry 1002. The control circuitry 1002 is coupled to the wavelength locker 508 and the laser 502. The control circuitry 1002 may comprise optical and/or electrical circuitry. The control circuitry may receive signals from the wavelength locker 508 and send control signals to the laser 502 and/or the wavelength locker 508. For example, in the non-limiting embodiment shown, the wavelength locker 508 may output an output signal, or multiple output signals to photodetectors 1003. For example, the wavelength locker 508 may comprise a wavelength locker of the type shown in FIG. 1A and photodetectors may be positioned at ends of input waveguide 108a and output waveguide 108b to detect the amount of light in those waveguides. The photodetectors 1003 may provide electrical signals S1 and S2 to the control circuitry 1002 indicative of the amount of light detected by the photodetectors, which in turn may be indicative of an amount of light detected by the wavelength locker 508. Such signals may provide an indication of the frequency of the laser light output at output port 512. Based on the received signals, the control circuitry may provide a control signal S3 to the laser 502 to tune the frequency of the laser. The wavelength locker 508 and control circuitry 1002 may also exchange signals S4. Signals S4 may include an output of the temperature sensor of the wavelength locker, provided to the control circuitry 1002. Signals S4 may include a heater control signal sent from the control circuitry 1002 to the heater of the wavelength locker 508 to control an amount of heat produced by the heater. It should be appreciated that a system configuration including photodetectors and/or control circuitry like that shown in FIG. 10 may be used in connection with any of the embodiments of wavelength selectors and lasers described herein.

In FIG. 10 the photodetectors 1003 are shown as separate from the wavelength locker 508 and control circuitry 1002. In some embodiments, a photodetector may be considered part of the wavelength locker or part of the control circuitry.

Returning to FIG. 10, the illustrated components may be disposed on a substrate 1004. In some embodiments, the components are monolithically integrated on the substrate. For example, in some embodiments the substrate 1004 may be a semiconductor substrate and the components may be monolithically integrated on the semiconductor substrate. In some embodiments, the substrate 1004 is a silicon substrate. The use of an integrated wavelength selector of the types described herein may allow for all, or substantially all, of the components illustrated in FIG. 10 to be monolithically formed on a single substrate. In some embodiments, the components of optical system 1000 may be combined onto a single substrate 1004 but may not be monolithically formed on the substrate. For example, the substrate 1004 may be a printed circuit board (pcb), and the components of the optical system may be positioned on the printed circuit board. Forming the optical system 1000 on a single substrate may provide significant cost and space savings compared to optical systems utilizing discrete components formed on multiple substrates. The manufacturing of such a system may be less complex than a system using discrete components and multiple substrates.

It should be appreciated from the foregoing that aspects of the present application provide tunable lasers. Tunable lasers may have any of the configurations illustrated in FIGS. 5-10.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. An integrated wavelength selector, comprising:
a substrate;
an integrated heater on the substrate;
an integrated silicon temperature sensor on the substrate; and
a ring waveguide of a first material disposed vertically between the integrated heater and the integrated silicon temperature sensor, the first material exhibiting a lower temperature coefficient of resonant frequency (TCF) than silicon.

2. The integrated wavelength selector of claim 1, wherein the integrated heater is a ring substantially overlying the ring waveguide of the first material.

3. The integrated wavelength selector of claim 1, wherein the first material comprises silicon nitride.

4. The integrated wavelength selector of claim 1, wherein the integrated silicon temperature sensor is a p-n diode ring.

5. The integrated wavelength selector of claim 1, wherein the integrated wavelength selector is disposed in a cavity of a tunable laser.

6. The integrated wavelength selector of claim 5, further comprising a plurality of integrated heaters, integrated silicon temperature sensors, and ring waveguides disposed in the cavity of the tunable laser.

7. The integrated wavelength selector of claim 1, wherein the integrated wavelength selector is coupled to an output of a laser and configured as a wavelength locker.

8. The integrated wavelength selector of claim 1, further comprising a plurality of temperature isolation trenches disposed inside and outside the integrated silicon temperature sensor.

9. The integrated wavelength selector of claim 1, wherein the first material is silicon nitride, and wherein the ring waveguide has a larger radius than the integrated silicon temperature sensor.

10. The integrated wavelength selector of claim 1, wherein the first material is silicon nitride, and wherein the integrated wavelength selector further comprises first and second waveguides disposed on opposite sides of the ring waveguide.

11. A tunable wavelength selector, comprising:
a micro-heater;
a micro-temperature sensor formed of silicon; and
an optical filter of a first material disposed vertically between the micro-heater and the micro-temperature sensor, the first material exhibiting a lower temperature coefficient of resonant frequency (TCF) than silicon.

12. The tunable wavelength selector of claim 11, wherein the micro-heater is ring-shaped and configured to substantially overlie the optical filter.

13. The tunable wavelength selector of claim 11, wherein the first material comprises silicon nitride.

14. The tunable wavelength selector of claim 11, wherein the micro-temperature sensor is a p-n diode ring.

15. An apparatus, comprising a tunable laser having a laser cavity, and the tunable wavelength selector of claim 11 disposed within the laser cavity.

16. The apparatus of claim 15, comprising a plurality of ring resonators disposed within the laser cavity.

17. An apparatus, comprising a tunable laser and the tunable wavelength selector of claim 11 coupled to an output of the tunable laser.

18. The tunable wavelength selector of claim 11, further comprising a plurality of temperature isolation trenches disposed inside and outside the micro-temperature sensor.

19. The tunable wavelength selector of claim 11, wherein the first material is silicon nitride, the optical filter is a ring resonator, and wherein the ring resonator has a larger radius than the micro-temperature sensor.

20. The tunable wavelength selector of claim 11, wherein the first material is silicon nitride, and wherein the optical filter comprises first and second waveguides disposed on opposite sides of a ring waveguide.

* * * * *